(12) United States Patent
DeLuca et al.

(10) Patent No.: US 6,582,084 B2
(45) Date of Patent: Jun. 24, 2003

(54) PROJECTOR HAVING AN INVERTED HEAD OPTICAL ARRANGEMENT

(75) Inventors: Patricia H. DeLuca, Round Rock, TX (US); Dennis F. Vanderwerf, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 29 days.

(21) Appl. No.: 09/811,936

(22) Filed: Mar. 19, 2001

(65) Prior Publication Data

US 2002/0145706 A1 Oct. 10, 2002

(51) Int. Cl.[7] ............................................... G03B 21/28
(52) U.S. Cl. ........................ 353/63; 353/97; 353/DIG. 3
(58) Field of Search ........................... 353/63, 65, 100, 353/102, 38, DIG. 3, DIG. 4, DIG. 6

(56) References Cited

U.S. PATENT DOCUMENTS

| 3,191,491 | A |   | 6/1965  | Pignone et al. ............. 88/24     |
| 3,536,391 | A | * | 10/1970 | Anderson et al. ...... 353/DIG. 6     |
| 4,067,026 | A |   | 1/1978  | Pappanikolaou ............ 354/77      |
| 4,249,205 | A |   | 2/1981  | Buchroeder ................ 358/60     |
| 4,537,474 | A |   | 8/1985  | Asterö ....................... 350/432  |
| 4,735,500 | A |   | 4/1988  | Grunwald .................... 353/61   |
| 4,741,613 | A | * | 5/1988  | Vanderwerf .................. 353/38   |
| 4,867,555 | A | * | 9/1989  | Vanderwerf ................. 353/100   |
| 5,442,415 | A |   | 8/1995  | Chao                                   |
| 5,911,490 | A |   | 6/1999  | Ishikawa et al. .............. 353/99  |
| 5,947,576 | A |   | 9/1999  | Sato et al.                            |
| 6,170,954 | B1 |  | 1/2001  | Kai et al. .................... 353/101|

FOREIGN PATENT DOCUMENTS

| DE | 3443355  | 5/1986  |
| JP | 63261243 | 10/1988 |
| JP | 08152680 | 6/1996  |
| JP | 08234311 | 9/1996  |
| JP | 08314006 | 11/1996 |

* cited by examiner

*Primary Examiner*—William Dowling
(74) *Attorney, Agent, or Firm*—Yen Tong Florczak (57) ABSTRACT

An overhead projector including a Fresnel lens, a single element meniscus projection lens having a concave side and a convex side, and a folding mirror placed in an optical path between the Fresnel lens and the projection lens. The projection lens is oriented to have the concave side optically facing the Fresnel lens. The optical design of the overhead projector follows the following equation, $F_{Fres}=(F_{Lens}(M_{Lens}+1)/M_{Lens}-SLD)/(M_{Fres}+1)$, where the Fresnel lens has a focal length $F_{Fres}$, and a magnification $M_{Fres}$, the projection lens has a focal length $F_{Lens}$ and a magnification $M_{Lens}$, and SLD is the distance from the stop position and the projection lens.

17 Claims, 10 Drawing Sheets

PROJECTOR HAVING AN INVERTED HEAD OPTICAL ARRANGEMENT

RELATED APPLICATIONS

The present application is related to co-pending, commonly assigned application entitled "Low Profile Overhead Projector Having a Foldable Post" which was filed on the same day and which is hereby incorporated by reference.

BACKGROUND OF THE INVENTION

The present invention relates to an improved optical design for an overhead projector. In particular, the present invention relates to an overhead Projector having a singlet lens optical design for an inverted projection head that reduces the height profile of the overhead projector and allows better sightlines for the audience.

Figure 1:
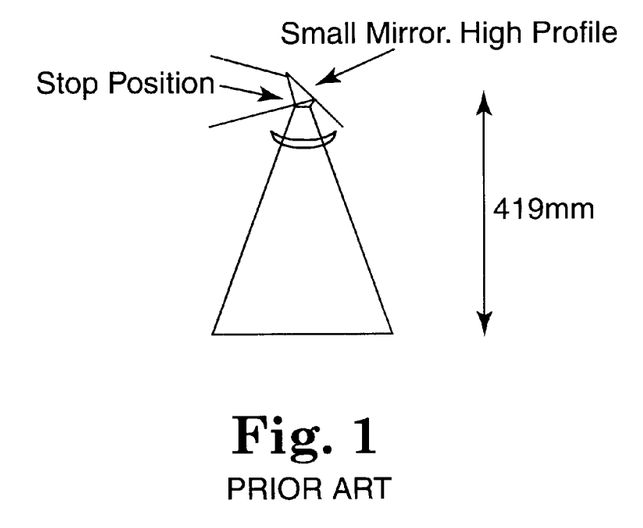
FIG. 1 is a schematic drawing of the optical design for a traditional singlet projection lens overhead projector.

A conventional overhead projector includes a light source, a horizontal light transmissive stage, and a projection head suspended above the stage. The stage includes a Fresnel lens. As illustrated in FIG. 1, in a conventional overhead projector using a single element meniscus projection lens, light passes from the light source through the Fresnel lens below the stage on which a transparent object containing the image to be projected is located. After the light passes through the transparent object, the light passes first through the single element meniscus projection lens and then is reflected off a folding mirror toward a projection screen. To obtain good image quality, the convex surface of the meniscus projection lens must face the stage, and the light from the projection lamp focuses at a stop position at a specified distance from the concave surface of the meniscus projection lens. The projection lens acts somewhat like a camera rear landscape lens, e.g., as described in *Lens Design Fundamentals*, by Rudolph Kingslake, relevant portions of which are hereby incorporated by reference, with the Fresnel lens focal distance defining the effective stop position.

The focal length of the projection lens and the distance to the projection screen determine the distance necessary between the stage and the lens (and therefore the height of the projection head) to create a focused image. A typical projection head height is approximately 420 mm, for a 292 mm focal length projection lens at image magnification of about 6×.

A protruding tall projection head tends to block the audience's view of the screen. As a result, attempts have been made to lower the height of the projection head.

Figure 2A:
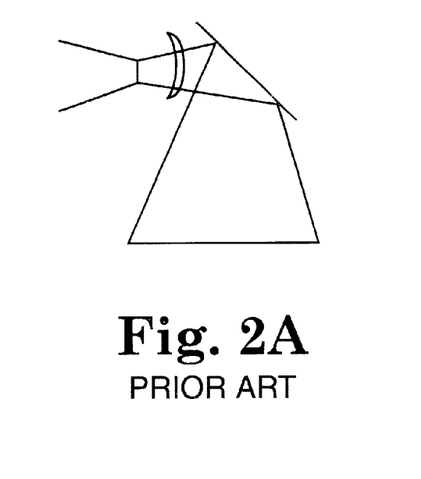
FIG. 2 is a schematic drawing of the optical design of a traditional singlet projection lens inverted head overhead projector and a plan view of an exemplary mirror for such projector.
Figure 2B:
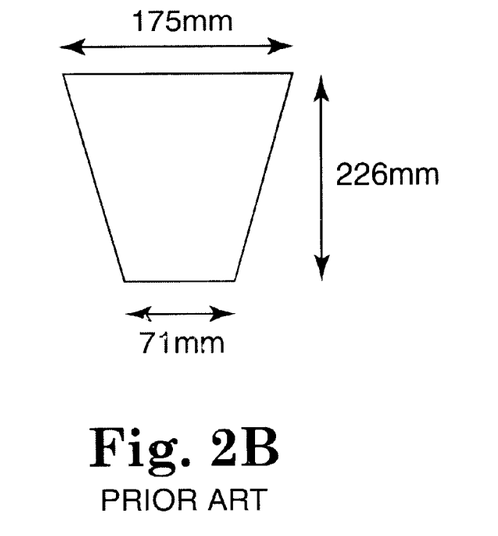

An alternative projection design is called an "inverted head" projector. As illustrated in FIG. 2a, in an inverted head projector, the projection lens is located such that light passes through the transparent object, then is reflected off a folding mirror and then passes through the projection lens and toward the projection screen. The mirror folds the light path, allowing the projection head assembly (which includes the folding mirror and the projection lens) to be positioned closer to the stage than with a non-inverted head assembly. However, since the mirror truncates the light cone closer to the base (and farther way from the waist of the light cone), the mirror dimensions are larger than those needed for a conventional head projector. FIG. 2b illustrates exemplary dimensions of a mirror, for a 292 mm projection lens at an image magnification of about 6× and a projection head height of about 320 mm.

As a result, while the projection head is positioned lower, the projection head is larger in size. A low-height large projection head may be as obtrusive as a higher, but smaller, projection head.

In addition, a single element meniscus projection lens, with the mirror positioned below the lens, e.g., inverted, places the stop position of the projector in front of the lens, facing the concave surface of the lens. While this provides good optical performance, this creates a "hot spot" in the open space directly in front of the projection lens. In overhead projectors using high power lamps, an unprotected hot spot may reach temperatures sufficient to ignite combustible materials or potentially to injure a user.

The need remains for an overhead projector having an optical design that reduces the obstruction of the lines of sight of the audience.

SUMMARY OF THE INVENTION

The present invention is directed to an overhead projector comprising a transmissive stage including a Fresnel lens, and a projection head placed above the stage. The projection head includes a mirror and a single element meniscus projection lens. The Fresnel lens focal point defines a projection lens stop position. The Fresnel lens defines a light cone and the mirror is a low profile mirror having dimensions corresponding to the size of light cone at the mirror.

A light path is defined from the Fresnel lens to the projection head and onto a projection surface. The mirror is placed ahead of the projection lens along the light path and the stop position of the projection lens is between the projection lens and the mirror.

The optical design is arranged such that, $$F_{Fres} = (F_{Lens}(M_{Lens}+1)M_{Lens} - SLD)(M_{Fres}+1),$$

where the Fresnel lens has a focal length $F_{Fres}$, and a magnification $M_{Fres}$, the projection lens has a focal length $F_{Lens}$ and a magnification $M_{Lens}$, and SLD is the distance from the projection lens stop position to the projection lens.

The single element meniscus lens includes a convex side and a concave side. In the present novel arrangement, the concave side of the projection lens faces the mirror, while the convex side faces the screen. The term "faces" is referenced upon the position along the optical path.

In alternative embodiments of the present invention, $$250 \text{ mm} \leq F_{Lens} \leq 400 \text{ mm}.$$

In a first exemplary embodiment, the projection lens has a focal length of about 355 mm and the Fresnel lens has a focal length of about 175 mm. In a second embodiment, the projection lens has a focal length of about 292 mm and the Fresnel lens has a focal length of about 140 mm. In a third exemplary embodiment, the projection lens has a focal length of about 400 mm and the Fresnel lens has a focal length of about 200 mm.

The overhead projector may further comprise a light source, wherein the Fresnel lens forms a focus point, the focus point being located between the mirror and the projection lens. A protective encasement may be placed to limit access to the focus point.

DETAILED DESCRIPTION OF THE INVENTION

Figure 3:
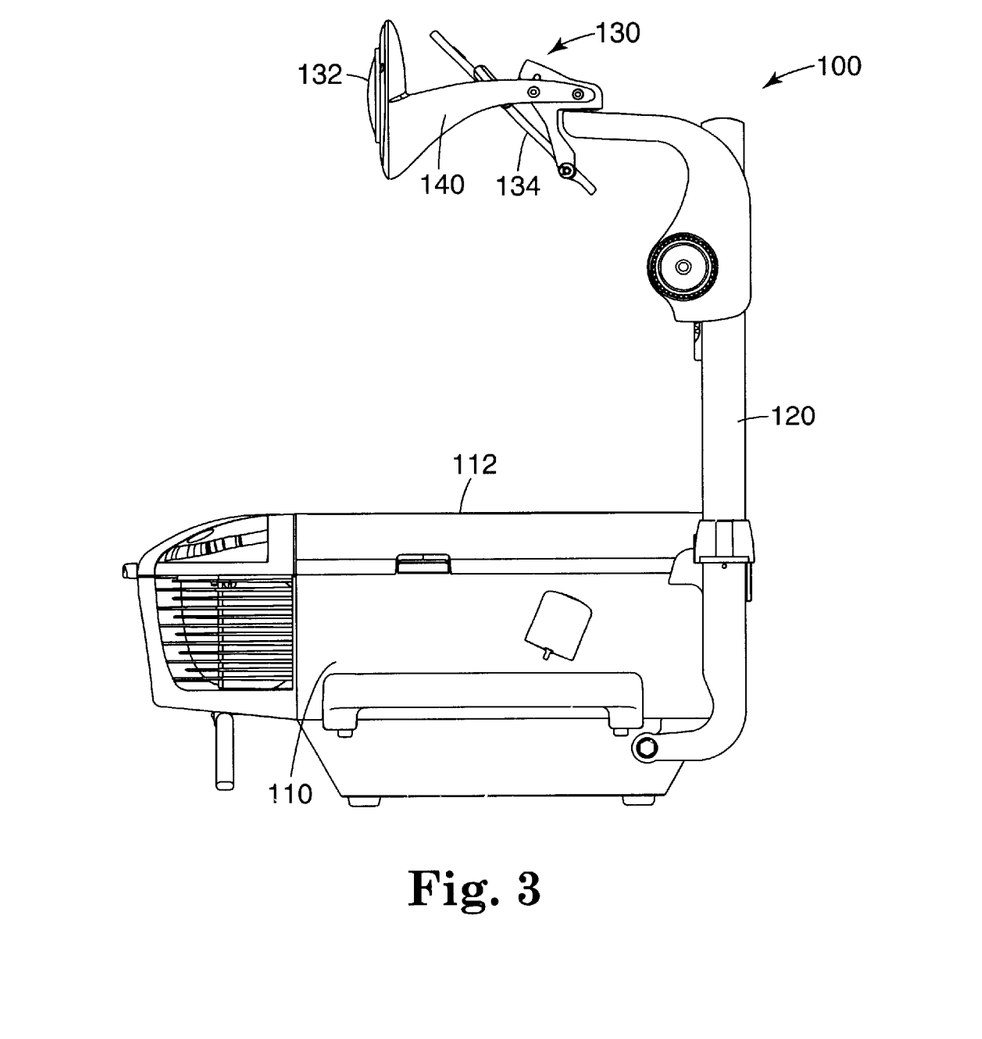
FIG. 3 is a view of the side of an embodiment of a singlet projection lens inverted head overhead projector in accordance with the present invention.
Figure 5:
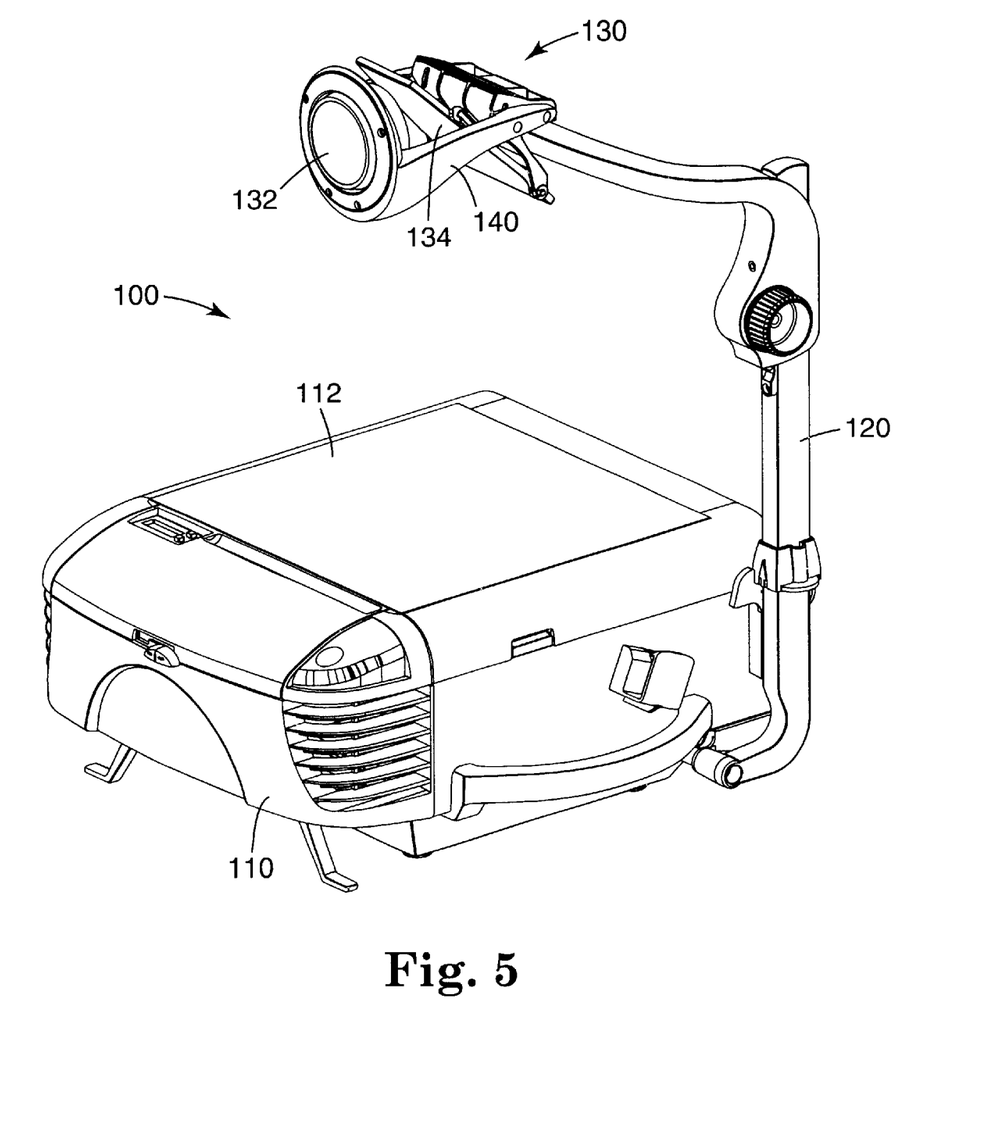
FIG. 5 is a perspective view of the overhead projector illustrated in FIG. 3.
Figure 6:
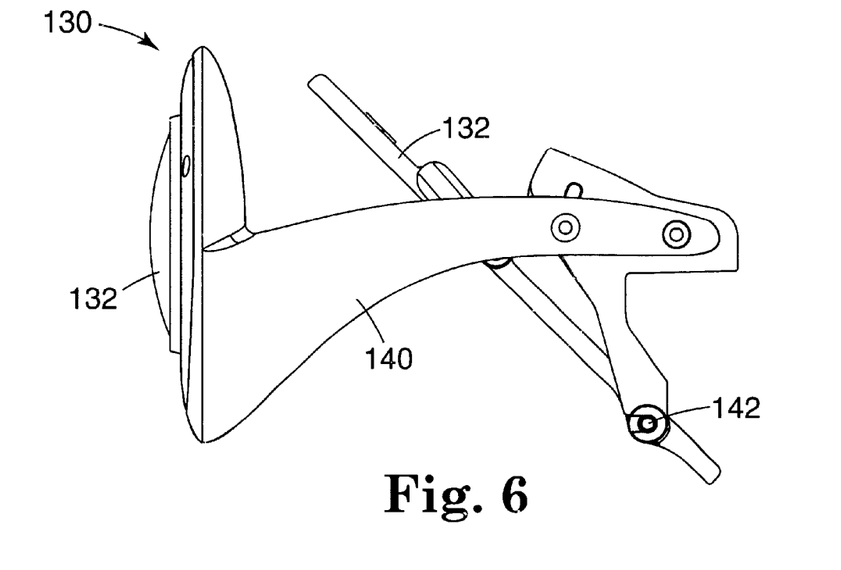
FIG. 6 is a side elevation view of the projection head assembly of the overhead projector illustrated in FIG. 1.

The present invention uses an optical design that includes an inverted head. As illustrated in FIGS. 3, 5 and 6, the projector 100 includes a main body 110 a head support arm 120, and a head assembly 130. The main body 110 includes a transmissive stage 112 having a Fresnel condensing lens positioned closely underneath. Inside the main body 110 resides a light source (not shown). The arm 120 suspends a head assembly 130 over the stage 112. The head assembly 130, better seen in FIG. 6, includes a lens 132 and a mirror 134. In the present embodiment, the mirror 134 is hingedly mounted for folding during storage at point 142.

As described in more detail in related application entitled "Low Profile Overhead Projector Having a Foldable Post", the arm and the projection head may fold to the side of the overhead projector body 110 for storage ease.

As in the OHP illustrated in FIG. 2, the projection lens 132 is located such that light passes through a transparency placed on the stage 112, is reflected off the folding mirror 134 and then passes through the projection lens 132 and toward a projection screen (not shown). The projection lens 132 is a single element meniscus lens having a concave surface and a convex surface. The mirror 134 folds the light path, allowing the projection head assembly 130 to be positioned closer to the stage than with a non-inverted head assembly. The effective stop position 136 is between the projection lens 132 and the transmissive stage 112. More precisely, the effective stop position formed by the stage Fresnel lens 112 with respect to the projection lens is between the mirror 134 and the projection lens 132.

However, the present invention differs from other inverted head designs in the optical design. Previous designs used a multi-element projection lens where it was not necessary to place the stop outside the projection lens, as is required for a good optical performance with single element meniscus projection lens. The present design reverses the orientation of the meniscus lens, placing the stop position and focal position of the Fresnel lens between the projection lens and the stage. This requires a Fresnel lens with a shorter focal distance than in conventional projection head configurations. This novel design provides good optical performance for the projection lens and minimizes the size of the inverted folding mirror.

Figure 4A:
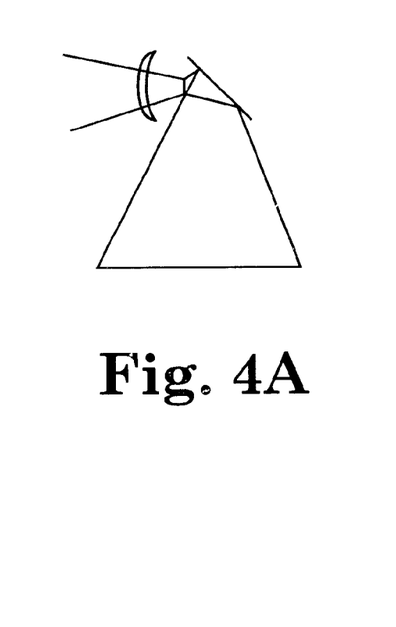
FIG. 4 is a schematic view of the optical design of an OHP in accordance with the present invention and a plan view of an exemplary mirror in accordance with the present invention.
Figure 4B:
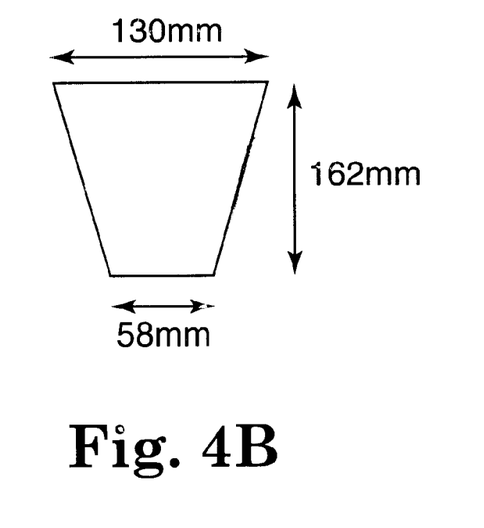

By comparing FIGS. 2B and 4B, one may see how the optical design of the present invention allows for a significant reduction in the size of the mirror and thus of the projection head. Also, by comparing FIG. 1 and FIG. 4A, it may be appreciated the reduction in height of the projection head of the present invention.

Combined with the shorter focal distance of the Fresnel lens, an embodiment of the optical design of the present invention includes a singlet projection lens 132 having a longer focal length of about 355 mm. The singlet projection lens 132 is positioned such that the convex surface is toward the screen rather than toward the stage as in a conventional projector and the concave surface optically faces the mirror (and stage) rather than the projection surface (screen).

Figure 9:
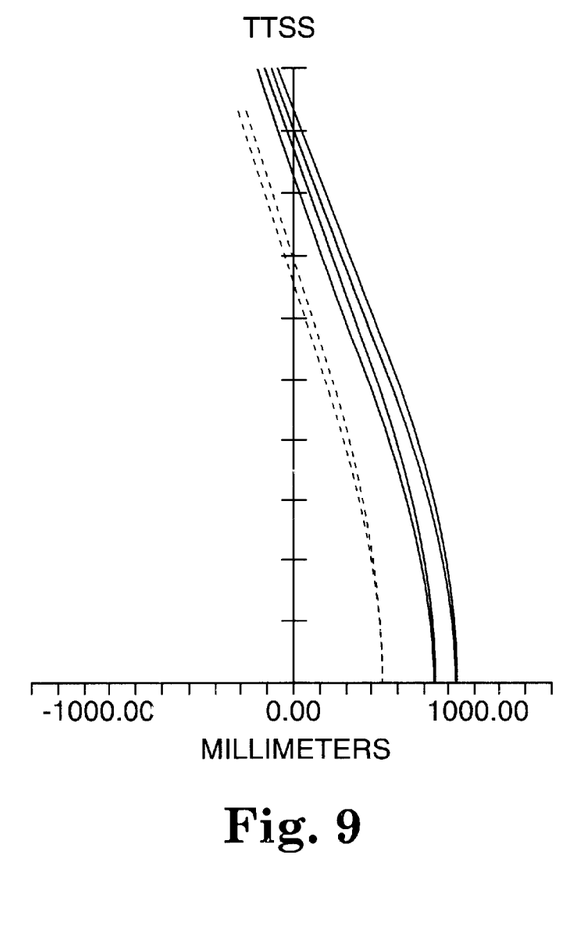
FIG. 9 is a plot of the tangential (T) and sagittal (S) field curvature for an overhead projector singlet lens of 355 mm in an inverted head configuration.
Figure 10:
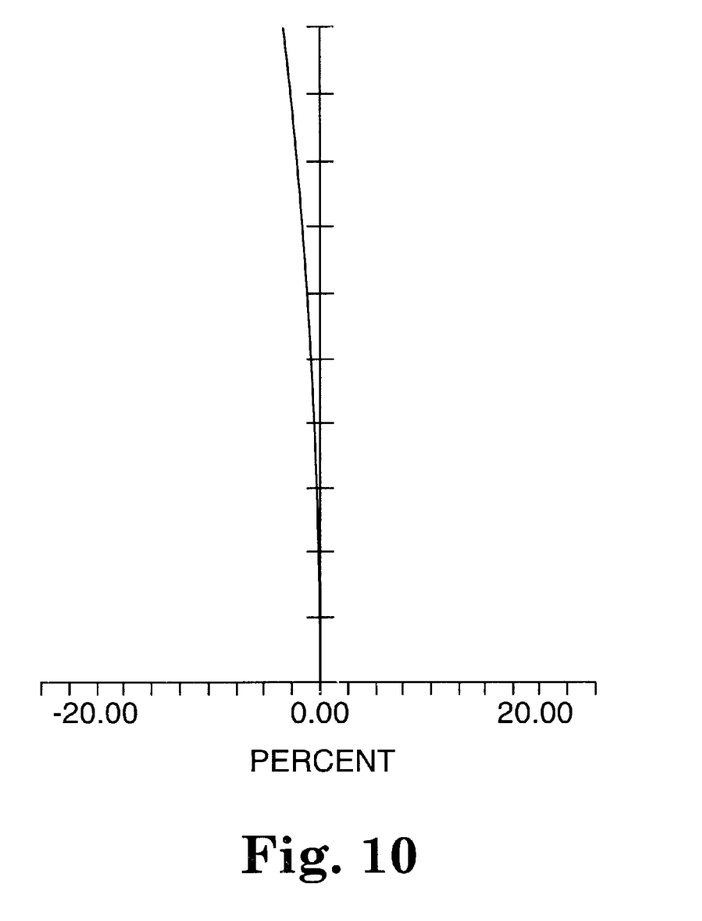
FIG. 10 is a plot of the optical distortion for the same optics as described in FIG. 8.

An inverted head overhead projector with front landscape lens design using same projection lens as conventional optics may have a Fresnel lens focal length of about 174 mm and a projection lens focal length of about 292 mm. FIGS. 9 and 10 illustrate the field curvature and optical distortion of this system with the stop at about 365 mm above the stage. As shown by FIGS. 9 and 10, such system would give poor optical performance.

Figure 7:
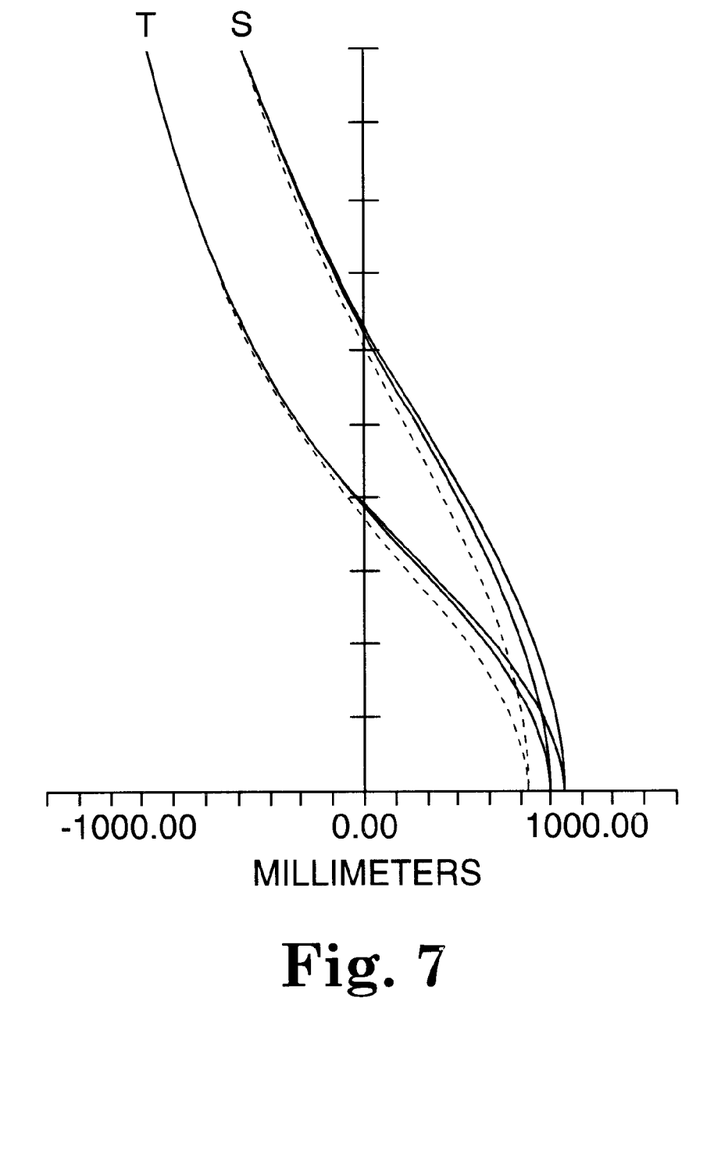
FIG. 7 is a plot of the tangential (T) and sagittal (S) field curvature for a conventional overhead projector singlet lens of 292 mm in an inverted head configuration.
Figure 8:
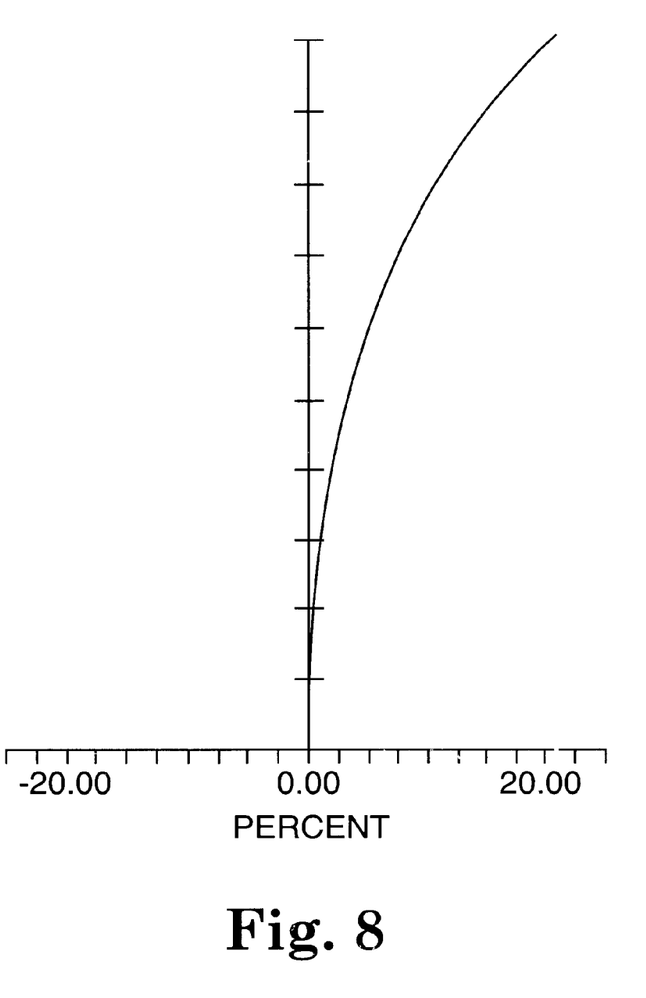
FIG. 8 is a plot of the optical distortion for the same optics as described in FIG. 7.

An inverted head overhead projector according to the current invention may have a Fresnel lens focal length of about 174 mm and a projection lens focal length of about 355 mm, in a range of about 320 mm to 390 mm. The Fresnel lens focal length should be matched with the singlet lens focal length so that the stop position falls in the optimum location for image quality. The optical performance of the projection singlet lens may be optimized by choosing the best combination of lens focal length, lens bending, aspheric or spherical lens surfaces, and location of the stop position. FIGS. 7 and 8 show the field curvature and optical distortion of this system with the stop at about 365 mm above the stage. As illustrated in FIGS. 7 and 8, the inverted 355 mm singlet gives good optical performance is shown below.

Using a longer focal length singlet in a front landscape lens design in combination with a shorter focal distance Fresnel lens allows the stop position to be chosen for optimized optical performance. It is possible to determine the optimum combination of Fresnel focal distance and projection lens back focal distance so that the following condition is met: that the waist of the light cone is positioned at the effective stop position for the singlet. This placement optimizes the optical performance for that system. In this manner a projector of the current invention may be created using different focal length projection lenses coupled with a Fresnel lens of the appropriate focal length. For conventional overhead projectors, the range of focal lengths for projection lenses is between 250 mm and 400 mm, and the range of projection lens image magnifications is between 3× and 12×. The relationship between the Fresnel lens focal length $F_{Fres}$ and the projection lens focal length can be defined in terms of the following equation:

$$F_{Fres}=(F_{Lens}(M_{Lens}+1)M_{Lens}-SLD)/(M_{Fres}+1) \qquad \text{(equation 1)}$$

Where $F_{Fres}$ is the focal length of the Fresnel lens, $F_{Lens}$ is the focal length of the projection lens, $M_{Fres}$ is the magnification of the Fresnel lens, $M_{Lens}$ is the magnification of the projection lens, and SLD is the distance from the stop to the projection lens.

For example, for an image magnification of $M_{Lens}$=5.7×, a Fresnel magnification of $M_{Fres}$=1.1×, and a stop to projection lens distance of SLD=50 mm, the conditions of this invention could be met by the following combinations of projection lens and Fresnel lens focal lengths:

| Projection Lens Focal Length $F_{Lens}$ | Fresnel Lens Focal Length $F_{Fres}$ |
|---|---|
| 355 mm | 175 mm |
| 292 mm | 140 mm |
| 400 mm | 200 mm |

Additionally, the choice of the projection lens design, including the optimum stop to projection lens distance SLD, as well as the lens focal length, lens bending, the possible inclusion of aspheric or spherical lens surfaces, and the stop position, provides good image quality for the entire projected image over the required magnification range of the projector. General concepts for the optimization of landscape lens design are described in *Lens Design Fundamentals,* by Rudolph Kingslake, relevant portions of which are hereby incorporated by reference.

The present invention allows the projection head assembly to be positioned closer to the stage, making it easier for audience to see over the top of the projector head. Also, the present invention reduces the size of the inverted projection head folding mirror, making it easier for the audience to see around the projector head.

For example, as previously illustrated in FIG. 1, a non-inverted head overhead projector with conventional optics including a 182 mm Fresnel lens and a 292 mm singlet projection lens with the convex surface toward the stage may have a head assembly height of about 419 mm to folding point of the optical axis (center of the head) for a 60 inch (152.4 cm) wide screen image. In contrast, an inverted head overhead projector with optical design according to the present invention as illustrated in FIG. 4 may have a head assembly height of about 322 mm to folding point of the optical axis (center of the head) for a 60 inch (152.4 cm) wide screen image.

Similarly, an inverted head overhead projector with conventional optics may have a Fresnel focal distance of about 404 mm from the stage and a projection lens focal length of about 292 mm. This system would require a folding mirror of 277 sq. cm as illustrated in FIG. 2b. In contrast, an inverted head overhead projector according to the present invention may have a Fresnel lens focal distance from the stage of about 365 mm and a projection lens focal length of about 355 mm. This system would require a smaller folding mirror of about 151 sq. cm.

In addition, the present invention incorporates a rotation of the meniscus projection lens so that the convex surface is toward the screen. The present optical design puts the focus point of the illuminating light between the folding mirror and projection lens rather than after the projection lens. This location makes it easier to encase the effective stop position and/or to restrict access to that point, thus reducing a possible heat hazard to the user. In the projector head assembly 130 of FIG. 6, lens arms 140 holding the projection lens 132, and the folding mirror 130 are designed to restrict access to the focus point, forming a protective encasement. Other embodiments may include additional protective encasements such as mesh or plastic covers.

While the present invention has been described with a reference to exemplary referred embodiments, the invention may be embodied in other specific forms without departing from the spirit of the invention. Accordingly, it should be understood that the embodiments described and illustrated herein are only exemplary and should not be considered as limiting the scope of the present invention. Other variations and modifications may be made in accordance with the spirit and scope of the present invention.

What is claimed is:

1. An overhead projector comprising:
   a) a transmissive stage comprising a Fresnel lens;
   b) a projection head placed above the stage, the projection head comprising a mirror and a single element meniscus projection lens, the Fresnel lens focal point defining a projection lens stop position;
   c) wherein a light path is defined from the Fresnel lens to the projection head and onto a projection surface, wherein the mirror is placed before the projection lens along the light path and the stop position is between the projection lens and the mirror.

2. The overhead projector of claim 1, wherein, $F_{Fres}=(F_{Lens}(M_{Lens}+1)/M_{Lens}-SLD)/(M_{Fres}+1)$, where the Fresnel lens has a focal length $F_{Fres}$, and a magnification $M_{Fres}$, the projection lens has a focal length $F_{Lens}$ and a magnification $M_{Lens}$, and SLD is the distance from the stop position to the projection lens.

3. The overhead projector of claim 2, wherein $$250 \text{ mm} \leq F_{Lens} \leq 400 \text{ mm}.$$

4. The overhead projector of claim 1, wherein the single element meniscus lens includes a convex side and a concave side, wherein the concave side of the projection lens faces the mirror.

5. The overhead projector of claim 1, wherein the projection lens has a focal length of about 355 mm and the Fresnel lens has a focal length of about 175 mm.

6. The overhead projector of claim 1, wherein the projection lens has a focal length of about 292 mm and the Fresnel lens has a focal length of about 140 mm.

7. The overhead projector of claim 1, wherein the projection lens has a focal length of about 400 mm and the Fresnel lens has a focal length of about 200 mm.

8. The overhead projector of claim 1, further comprising a light source, wherein the Fresnel lens forms a focus point, the focus point being located between the mirror and the projection lens, the overhead projector further comprising a protective encasement to limit access to the focus point.

9. The overhead projector of claim 1, wherein the Fresnel lens defines a light cone and the mirror is a low profile mirror having dimensions corresponding to the size of light cone at the mirror.

10. A projection system comprising:
    a) a Fresnel lens having a focal length $F_{Fres}$, and a magnification $M_{Fres}$;
    b) a projection lens having a focal length $F_{Lens}$ and a magnification $M_{Lens}$, the Fresnel lens focus point forming a projection lens stop position;
    c) a mirror, placed in an optical path between the projection lens and the Fresnel lens;
    d) wherein, $F_{Fres}=(F_{Lens}(M_{Lens}+1)/M_{Lens}-SLD)/(M_{Fres}+1)$, where SLD is the distance from the projection lens stop position to the projection lens and the stop position of the is between the mirror and the projection lens.

11. The projection system of claim 10, wherein the projection lens is a single element meniscus lens having a concave surface and a convex surface, wherein the concave surface optically faces the Fresnel lens.

12. The projection system of claim 10, wherein $F_{Lens}$ is the focal length of the projection lens and:

$$250 \text{ mm} \leq F_{Lens} \leq 400 \text{ mm}.$$

13. The projection system of claim 10, further comprising a light source, wherein the Fresnel lens forms a focus point, the focus point being located between the mirror and the projection lens, the projection system further comprising a protective encasement to limit access to the focus point.

14. The projection system of claim 10, wherein the projection lens has a focal length of about 355 mm and the Fresnel lens has a focal length of about 175 mm.

15. An overhead projector comprising:
   a) a Fresnel lens,
   b) a single element meniscus projection lens having a concave side and a convex side;
   c) a folding mirror placed in an optical path between the Fresnel lens and the projection lens; and
   d) wherein the projection lens is oriented to have the concave side optically facing the Fresnel lens.
   e) wherein, $F_{Fres}=(F_{Lens}(M_{Lens}+1)/M_{Lens}-SLD)/(M_{Fres}+1)$, where the Fresnel lens has a focal length $F_{Fres}$, and a magnification $M_{Fres}$, the projection lens has a focal length $F_{Lens}$ and a magnification $M_{Lens}$, and SLD is the distance from a stop position and the projection lens.

16. The overhead projector of claim 15, wherein the stop position is between the mirror and the projection lens.

17. The overhead projector or claim 15, wherein $250 \text{ mm} \leq F_{Lens} \leq 400 \text{ mm}$.

* * * * *

UNITED STATES PATENT AND TRADEMARK OFFICE
CERTIFICATE OF CORRECTION

PATENT NO. : 6,582,084 B2  Page 1 of 1
DATED : June 24, 2003
INVENTOR(S) : Hughes, Patricia M.

It is certified that error appears in the above-identified patent and that said Letters Patent is hereby corrected as shown below:

Title page,
Item [75], Inventors, delete "Patricia H. DeLuca" and insert in place thereof
-- Patricia M. Hughes --.

Column 2,
Line 33, delete "$F_{Fres} = (F_{Lens}(M_{Lens} + 1)M_{Lens} - SLD)(M_{Fres}+1)$" and insert in place thereof
-- $F_{Fres} = (F_{Lens}(M_{Lens} + 1)/M_{Lens} - SLD)/(M_{Fres}+1)$ --

Column 4,
Line 61, delete "$F_{Fres} = (F_{Lens}(M_{Lens} + 1)M_{Lens} - SLD)/(M_{Fres}+1)$" and insert in place thereof
-- $F_{Fres} = (F_{Lens}(M_{Lens} + 1)/M_{Lens} - SLD)/(M_{Fres}+1)$ --

Column 5,
Line 66, delete "referred" and insert tin place thereof -- prefered --

Column 6,
Line 63, delete "of the"

Signed and Sealed this

Twenty-fifth Day of May, 2004

JON W. DUDAS
*Acting Director of the United States Patent and Trademark Office*